United States Patent [19]

Naito et al.

[11] Patent Number: 4,700,309
[45] Date of Patent: Oct. 13, 1987

[54] CONTROL APPARATUS FOR ASSEMBLING PARTS

[75] Inventors: Tadashi Naito, Nagoya; Kenzo Okuda, Toyota; Masakazu Ohmori, Okazaki; Toru Saijyo, Toyota; Ken Imaizumi, Okazaki, all of Japan

[73] Assignees: Toyota Jidosha Kabushiki Kaisha; Kabushiki Kaisha Ochiai Tekkojo, both of Japan

[21] Appl. No.: 767,437

[22] Filed: Aug. 20, 1985

[30] Foreign Application Priority Data

Sep. 7, 1984 [JP] Japan ................. 59-187741

[51] Int. Cl.$^4$ ............. G06F 15/46; G06K 13/063
[52] U.S. Cl. ................. 364/468; 235/375; 235/485
[58] Field of Search ........... 364/468, 469, 474, 475; 235/375, 385, 420, 475, 476, 477, 485; 271/265

[56] References Cited

U.S. PATENT DOCUMENTS

| | | | |
|---|---|---|---|
| 3,621,206 | 11/1971 | Scribner | 235/485 |
| 4,055,747 | 10/1977 | Jensen | 235/485 X |
| 4,213,040 | 7/1980 | Gokey et al. | 235/476 |
| 4,438,918 | 3/1984 | Ito et al. | 235/485 |
| 4,492,855 | 1/1985 | Garczynski et al. | 235/485 X |
| 4,493,107 | 1/1985 | Stockburger et al. | 235/485 X |
| 4,599,511 | 7/1986 | Stiller | 235/485 X |

Primary Examiner—Joseph Ruggiero
Attorney, Agent, or Firm—Parkhurst & Oliff

[57] ABSTRACT

An indication card has a plurality of apertures representing information code relating to parts to be assembled. The information code is determined by means of photodetectors of a reader and a processing unit. When the indication card is conveyed with 5 degrees of its inclination angle, no indication signal corresponding to the information code is produced. In order to detect the inclined indication card, there are provided a main and an auxiliary reading position detection photodetectors in the reader. The outputs of both detection photodetectors are used to determine the reading position of the indication card. The indication signal causes a corresponding one of lamps to be turned on which are provided regarding to the parts to be assembled.

6 Claims, 15 Drawing Figures

CONTROL APPARATUS FOR ASSEMBLING PARTS

BACKGROUND OF THE INVENTION

1. Field of the Invention

The present invention relates to a control apparatus for assembling parts, more particularly to a control apparatus for assembling the parts in which an indication card for assembly on which a plurality of apertures indicating information code are provided, is conveyed together with the parts which are to be assembled in order together along an assembly line and the information code on the indication card is read to output an information regarding to the parts to be assembled.

2. Description of Related Art

In an assembly line of a motor vehicle, for example, different kinds of parts regrading to different types of motor vehicle are conveyed along a single assembly line where different parts are assembled by the worker. It is necessary for the worker to be appropriately indicated as to which parts he should select to assemble the parts. No indication as to the selection of the parts causes the worker to fail to properly assemble the parts.

Therefore, there has been proposed a control apparatus for assembling the parts in which an indication card for assembly on which a plurality of apertures are provided to represent an information code which is read to output an indication information, is conveyed together with the parts on the assembly line.

Figure 10:
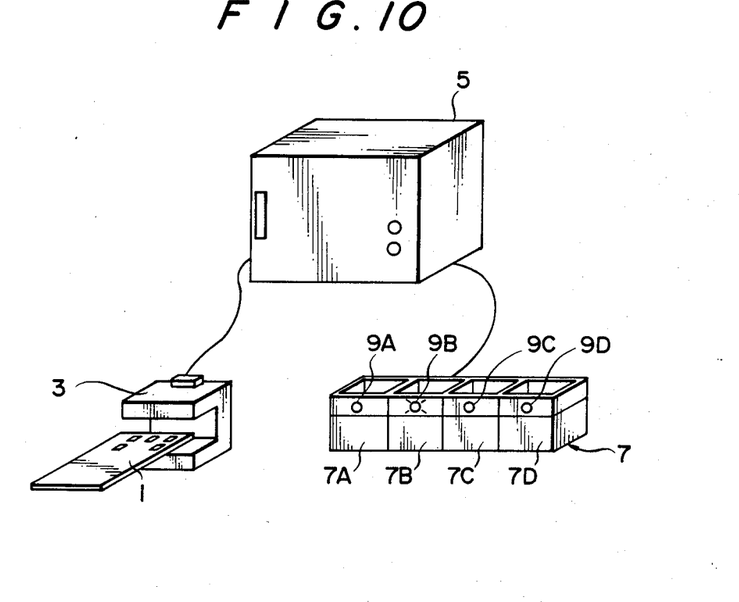
FIG. 10 is a perspective view of one example of the control apparatus proposed hitherto.

FIG. 10 shows one example of the proposed control apparatus comprising a reader 3 having a group of photodetectors and installed along an assembly conveyor (not shown) conveying several kinds of parts together with the indication card 1, and processing unit 5 processing outputs from the group of photodetectors to output an indication information useful for the selection of the parts. When the indication card 1 passes through the reader 3 and reaches a predetermined reading position where the information code of the indication card is read, the processing unit 5 decodes the outputs from the group of the photodetectors to output the indication signal to one of lamps 9A–9D of a parts receptacle 7.

Figure 11:
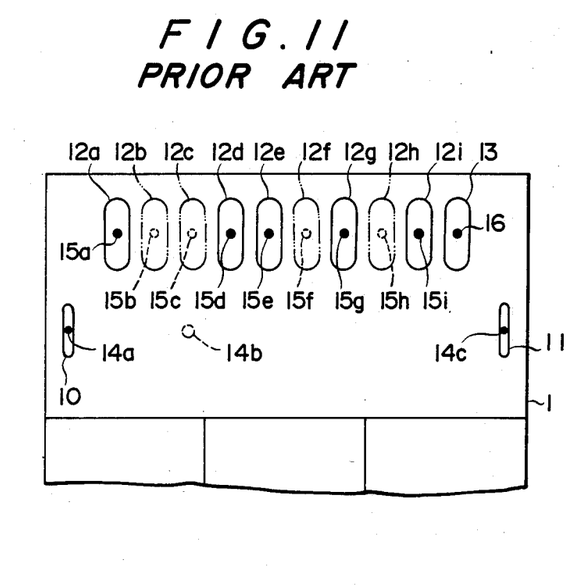
FIG. 11 is an explanatory view showing a relationship between the indication card and the sensors used in the control apparatus of FIG. 10.

Referring to FIG. 11, the indication card 1 has apertures 10 and 11 for the confirmation of the reading position of the indication card 1, apertures 12a, 12d, 12e, 12g and 12i representing the information code and an aperture 13 for parity check. The information code includes an information as to which parts the worker should select. For example, the apertures 12a, 12d, 12e, 12g and 12i represent information code "135". In this case, the aperture 13 is used to cause the number of apertures representing the information code and for parity check to be even in total. Along a passage of the reader 3 through which the indication card 1 passes, there are provided sensors 14a, 14b and 14c for the confirmation of the reading position of the indication card, sensors 15a–15i for reading of the information code of the indication card, and a sensor 16 for checking of parity. When the sensors 14a and 14c receive lights passing through the apertures 10 and 11 and the sensor 14b does not receive a light emitted from light emitting element of the sensor 14b, the position of the indication card is detected to be at the reading position.

Then the outputs of the sensors 15a–15i are taken by the processing unit 5 to read the information code of the indication card 1. Assuming that the information code "135" indicates an information as to the parts stored in a box 7B of the parts receptacle 7, the lamp 9B is turned on when the information code "135" is read by the processing unit 5. This causes the worker to easily access the parts to be assembled in the box 7B.

Figure 12:
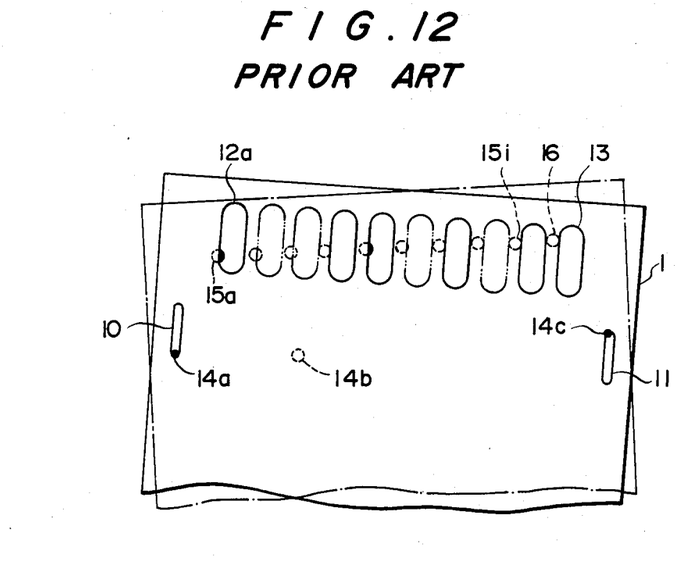
FIG. 12 is an explanatory view showing the indication card used hitherto which is conveying with inclination thereof.

However, the control apparatus as shown in FIGS. 10 and 11 may produce an erroneous information when the indication card 1 passes through the reader 3 while being inclined. Referring to FIG. 12, in this apparatus, whenever the lights passing through the apertures 10 and 11 are received by the light receiving element of the sensors 14a and 14c and no light is received by the light receiving element of the sensor 14b, the indication card 1 is detected to be at the proper reading position for reading of the information code of the indication card which is inclined on the reading passage of the reader 3. In FIG. 12, the sensors 15a, 15d, 15e, 15g and 15i by which respective lights passing through the corresponding apertures 12a, 12d, 12e, 12g and 12i should be received do not always receive the respective lights even when the indication card 1 is detected to be at the reading position.

SUMMARY OF THE INVENTION

It is an object of the present invention to provide a control apparatus for assembling parts in which when an indication card is conveyed while being inclined, no information code on the indication card is read by a processing unit.

According to the present invention, there is provided a control apparatus for assembling parts comprising:

an indication card having at least a pair of apertures for confirmation of reading position spaced from each other and a group of apertures representing an information code and provided on a line substantially parallel to a line connecting to the centers of the pair of apertures;

a plurality of information code reading sensors each including a pair of a light emitting element and a light receiving element, said information code reading sensors being arranged in such a manner that an interval between said information code reading sensors is identical with an interval between said apertures representing the information code and said light receiving element receives a light from said light emitting passing through said aperture representing the information code;

a pair of main reading position detecting sensors each including a pair of a light emitting element and a light receiving element, the main reading position detecting sensors being arranged in such a manner that an interval between the main reading position detecting sensors is identical with an interval between the pair of apertures for confirmation of the reading position and the light receiving element of the main reading position detecting sensors receives a light from a light emitting element passing through the pair of apertures for confirmation of the reading position;

a pair of auxiliary reading position detecting sensors each including a pair of a light emitting element and a light receiving element, the auxiliary reading position detecting sensors being arranged in such a manner that when the indication card is conveyed with a predetermined degree of inclination angle thereof or more, either one of the light receiving elements of the auxiliary reading position detecting sensors receives a light from the light emitting element of the auxiliary reading position detecting sensors even if the indication card is at the reading position; and a processor means connecting to the information code reading sensors and the main and auxiliary reading position detecting sensors, for determining as to whether the indication card reaches the reading position when both the light receiving elements of the main reading position detecting sensors receive the lights from the light emitting elements thereof and no light is received by both the light receiving elements of the auxiliary reading position sensors, so that the outputs of the light receiving elements of the information code reading sensors are processed to output an indication signal indicating an indication information, wherein no output of the light receiving element of the auxiliary reading position detecting sensors is taken by the processor means when at lest either one of the light receiving element of the auxiliary reading position sensors receives the light from the light emitting element thereof.

DETAILED DESCRIPTION OF THE PREFERRED EMBODIMENT

Figure 1:
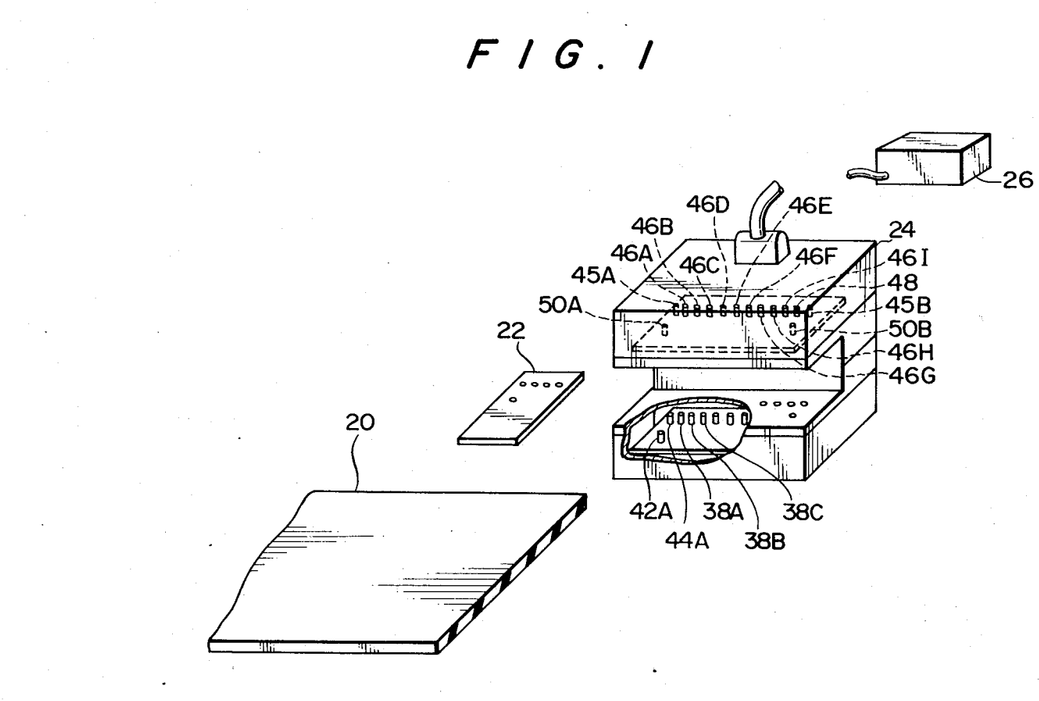
FIG. 1 is a perspective view of one example of a control apparatus according to the present invention.

FIG. 1 shows one example of the present invention. An indication card 22 is adapted to be conveyed along a conveyor belt 20 of an assembly conveyor conveying parts to be assembled. The indication card 22 has an information code described infra. A reader 24 is installed along the belt 20 and has a group of photodetectors in itself. The photodetectors are connected with a processing unit 26 which receives outputs of the photodetectors.

Figure 2:
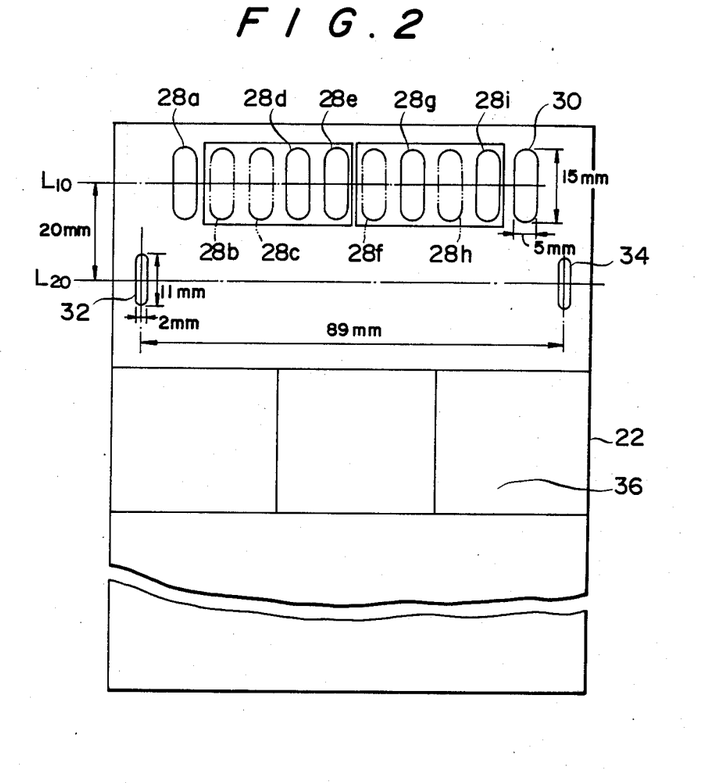
FIG. 2 is an elevational view of one example of an indication card used in the control apparatus in FIG. 1.

FIG. 2 shows the indication card 22 in detail which is a plate member made of resin and has a size of 170 mm long 100 mm wide×3 mm thick. Nine apertures 28a–18i for representing the information code and an aperture 30 for parity check can be provided at an upper portion of the indication card 22. These apertures are provided depending upon the information code corresponding to the parts to be assembled. The apertures 28f–28i are used for four lower bits, the apertures 28b–28e for four middle bits and the aperture 28a for a most significant bit. The information code defined by these apertures is represented in a form of binary coded decimal. Respective four bits of lower and middle bits can indicate "0"–"9" of the decimal system and nine apertures 28a–28i can indicate one hundred and ninety nine kinds of information codes at all. In particular case of the indication card 22 as shown in FIG. 2, five perforated apertures 28a, 28d, 28e, 28g and 28i indicate "135" as the information code. The aperture 30 for parity check is formed to make the number of the perforated apertures to be even so as to obtain a reliable reading of the information code. Each of the apertures 28a–28i and 30 of the indication card 22 is formed to be elliptic and has a size of 15 mm long×5 mm wide. Each distance between successive center lines of the apertures 28a–28i is 7.62 mm and a distance between adjacent edges of the apertures is 2.62 mm. Apertures 32 and 34 for the confirmation of the reading position of the indication card 1 are provided at the lower portion of the alignment of the apertures 28a–28i and 30. A distance between a center line L10 of the alignment of the apertures 28a–28i and 30 and a center line L20 of the alignment of the apertures 32 and 34 is 20 mm. Each of the apertures 32 and 34 is elliptic and has a size of 11 mm long×2 mm wide. A distance between two apetures 32 and 34 is 89 mm. In an area 36 of the lower side of the apertures 32 and 34, an information for assembly of the automotive parts is adapted to be visibly indicated.

Referring back to FIG. 1, disposed at the lower side of the reader 24 and a group of the photodetectors or sensors which include light receiving elements, such as phototransistors.

Figure 3:
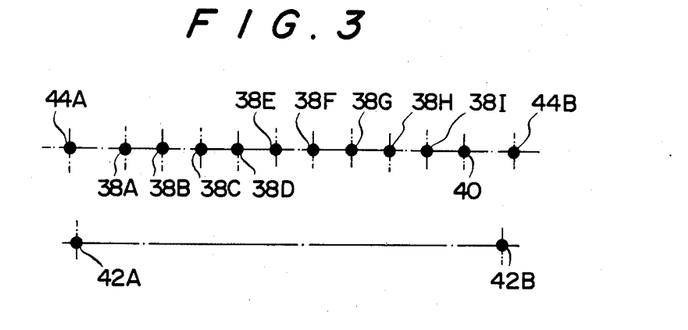
FIG. 3 is an explanatory view of an arrangement of sensors.

Referring to FIG. 3, the group of the light receiving elements 38A–38I function as information code reading sensors, a pair of the light receiving elements 42A and 42B as main reading position detecting sensors and a pair of the sensors 44A and 44B as auxiliary reading position detecting sensors. The light receiving elements 38A–38I, 42A and 42B, 44A and 44B, and 40 may be referred to as sensors hereinafter. The sensors 38A–38I, 42A and 42B, and 40 are responsive to lights passing through the apertures 28a–28i, 32 and 34, and 30, respectively.

The sensors 44A and 44B detect the correct reading position of the indication card 22 together with the first detecting sensors 42A and 42B. A distance between the first detecting sensors 42A and 42B corresponds to the distance between the apertures 32 and 34 for detection of the reading position of the indication card 22 and each distance between the sensors 38A–38I corresponds to each distance between the apertures 28a–28i.

Figure 4:
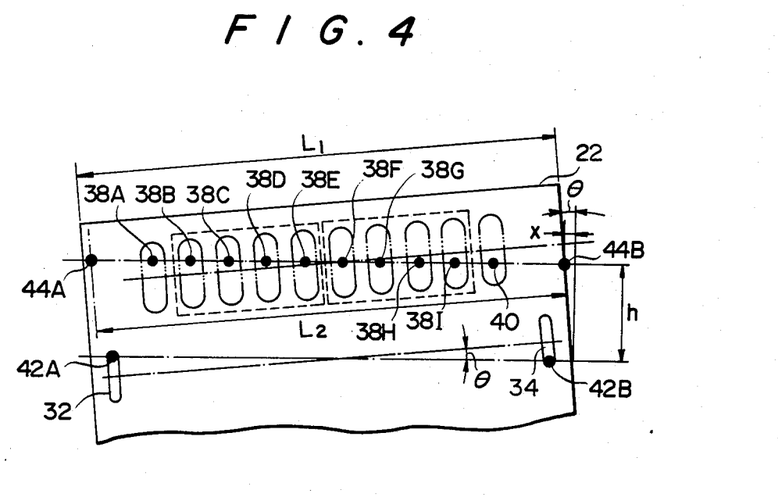
FIG. 4 is an explanatory view showing a relationship between the sensors shown in FIG. 3 and the indication card 22.

A distance L2 between two detecting sensors 44A and 44B is predetermined to be 94.5 mm in this particular case so that no light would be received by the detecting sensors 44A and 44B when the indication card 22 is conveyed while being inclined by 5 or more degrees of an inclination angle $\theta$ as shown in FIG. 4. The distance L2 is derived form the following formula.

$$L2 = L1 - 2 \cdot x - d/2 \cdot 2 \tag{1}$$

where

L1 : width of the indication card
$x = 20 \cdot \tan \theta$
d : effective diameter of each of the sensors Substituting 100, 5 and 2 for L1, $\theta$ and d, L2 is found to be 94.5 through x=1.75.

Referring again to FIG. 1, light emitting diodes 46A–46I, 48, 50A, 50B, 45A and 45B are disposed at the upper side of the reader 24.

Figure 5:
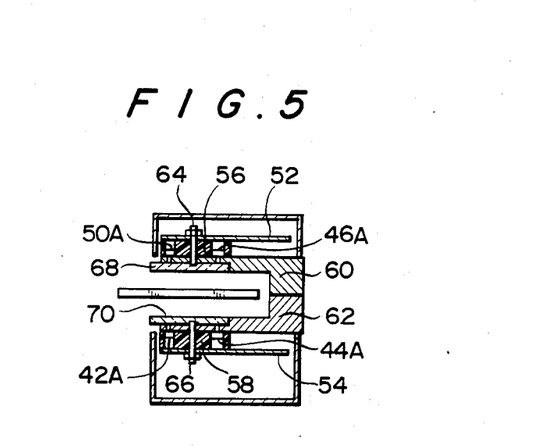
FIG. 5 is a sectional view of a reader 24 of FIG. 1.

FIG. 5 shows an arrangement of the light emitting and receiving elements of the reader 24 in detail. Fixedly secured to printed-wiring boards 52 and 54 are the light emitting diodes 46A–46I, 48, 50A, 50B, 45A and 45B and the sensors 38A–38I, 40, 42A, 42B, 44A and 44B. The printed-wiring boards 52 and 54 are fixedly secured to frames 60 and 62 through resin plates 56 and 58 by means of bolts 64 and 66. Glasses 68 and 70 are superimposed on the frames 60 and 62, respectively. The frames 60 and 62 have holes through which the lights from the light emitting diodes are transmitted. The light emiting elements of the phototransistors 38A–38I, 40, 42A, 42B, 44A and 44B can receive the lights from the corresponding light emitting diodes by way of the glass plate 70, the apertures of the indication card 22 and the glass plate 68.

Figure 6:
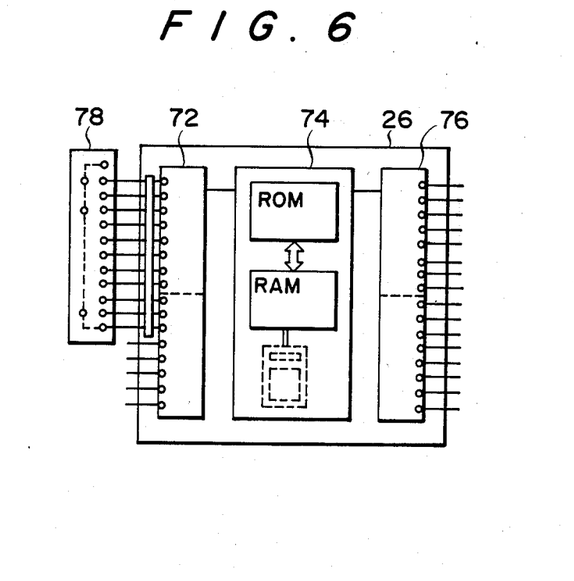
FIG. 6 is a block diagram of a processing unit 26 of FIG. 1.

Referring to FIG. 6, the processing unit 26 comprises an input card 72 as an input interface circuit, a control unit 74 including a CPU, a ROM and a RAM, and an output card 76 as an output interface circuit. The input card 72 is connected to an input terminal 78 provided in the reader 24 and adapted to receive the output from the sensors. The output card 76 is adapted to be connected to an indication device such as lamps and the like. The processing unit 26 is adapted to operate in accordance with a program prestored in the ROM so as to output a signal representing the indication information for assembly based on the detected outputs of the sensors 38A–38I.

Figure 7:
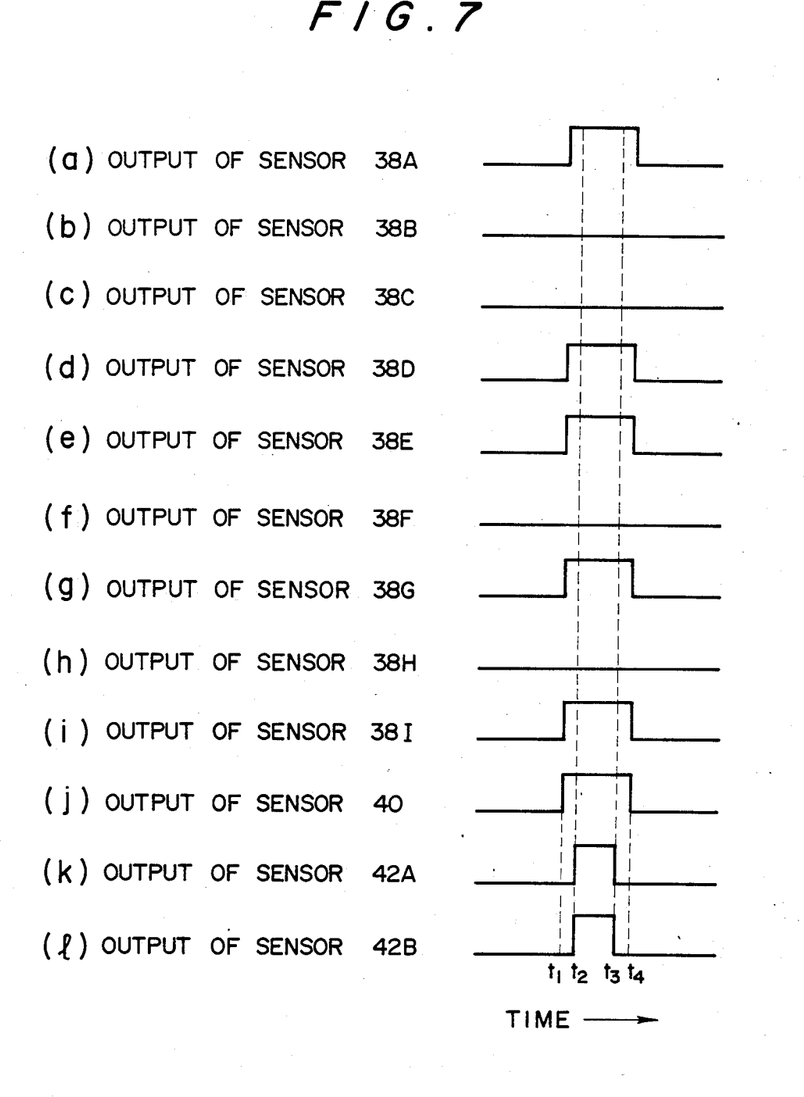
FIGS. 7 and 9 are time charts of outputs of the sensors of FIG. 3.

FIG. 7 shows a time chart of the outputs of the sensors described above. In the above-described apparatus according to the present invention, the sensors 38A, 38D, 38E, 38G, 38I and 40 are kept turning on between time points t1–t4. The sensors 42A and 42B are also kept turning on between time points t2–t3, when the indication card 22 passes though the reader 24 without any inclination angle of the indication card 22. In addition, the sensors 44A and 44B are kept turning off between time points t2–t3 (not shown). When both of the lights from the light emitting diodes 50A and 50B are received through the apertures 32 and 34 by the sensors 42A and 42B and both of the lights from the light emitting diodes 45A and 45B are interrupted by the indication card 22, the processing unit 26 judges that the indication card 22 reaches the reading position. In response to this judgement, the outputs of the sensors 38A–38I and 40 are read so that the information code of the conveyed indication card 22 is obtained. Reading of the outputs of these sensors is carried out at time points t2 and t3. When the procesing unit 26 judges that two reading data, i.e., two information codes read out at the time points t2 and t3 coincide with each other, the processing unit 26 outputs the indication information signal for assembly corresponding to the read information code indicating "135". The indication information signal for assembly causes the lamp 9B among lamps 9A–9D to be turned on.

Figure 9:
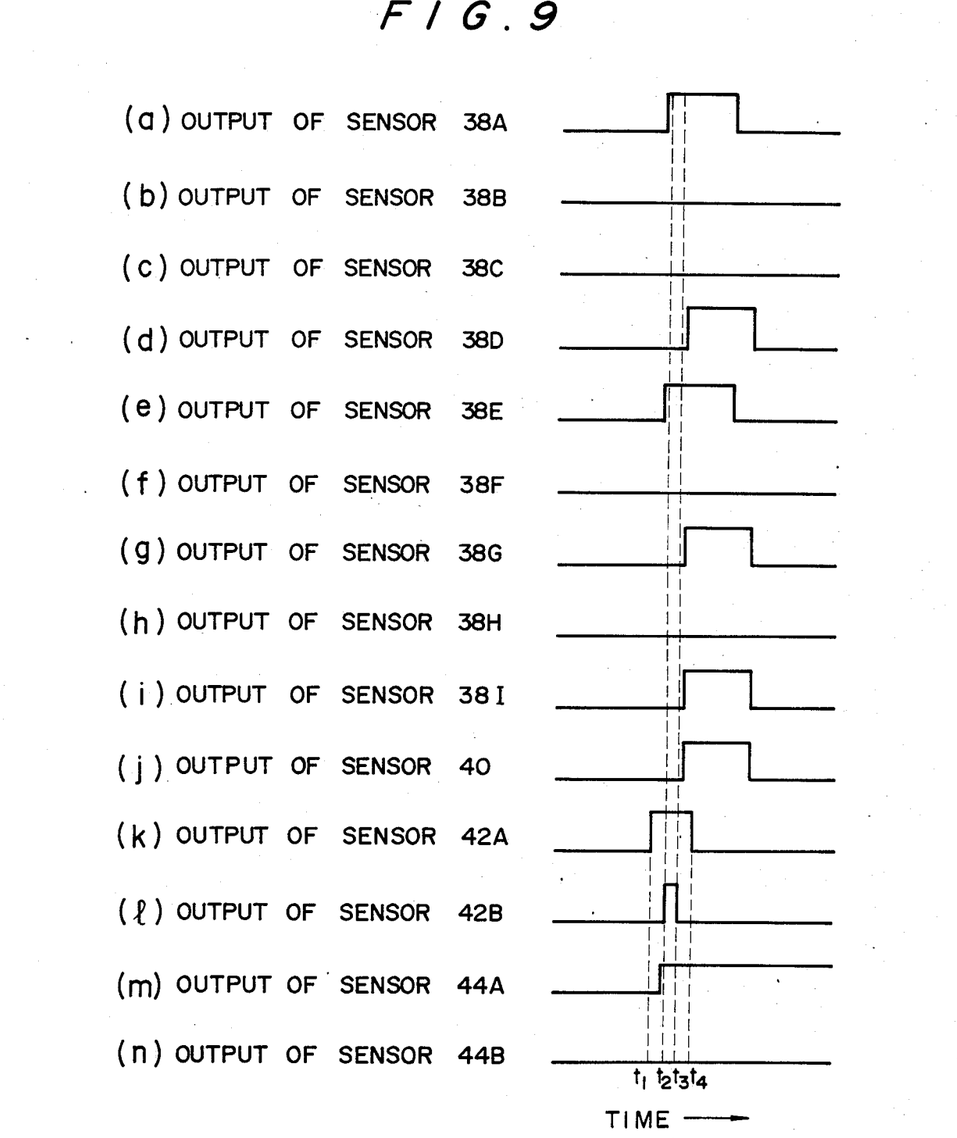

On the other hand, when the indication card 22 passes through the reader 24 with certain inclination angle more than 5 degrees with respect to a normal attitude, the output signals of the sensors 38A–38I, 40, 42A, 42B, 44A and 44B are changed as shown in FIG. 9. As will be understood from FIG. 9, when the processing unit 26 judges that the indication card 22 reaches the reading position at the time points t2 and t3, the sensors 38A and 38E are turned on and the sensors 38D, 38G, 38I and 40 are turned off. The information code indicated by the outputs of these sensors does not represent a true indication information defined by the apertures 28a, 28d, 28e and 28i of the indication card 22. The present invention is to avoid such an erroneous reading of the information code by providing two additional sensors 44A and 44B.

According to the embodiment of the present invention, the sensors 44A and 44B are provided in addition to the sensors 42A and 42B. Only when the sensors 42A and 42B are turned on and the sensors 44A and 44B are turned off, the processing unit 26 judges that the indication card 22 reaches the reading position. Therefore, no information code of the indication card 22 is adapted to be read by the processing unit 26 when any one of the sensors 44A and 44B is turned on.

Figure 8A:
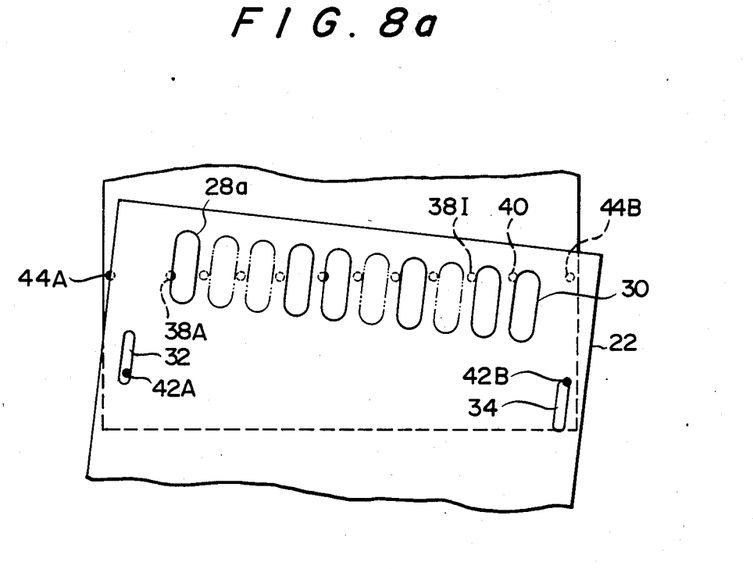
FIGS. 8a and 8b are explanatory views showing the indication card which is conveying with inclination thereof.
Figure 8B:
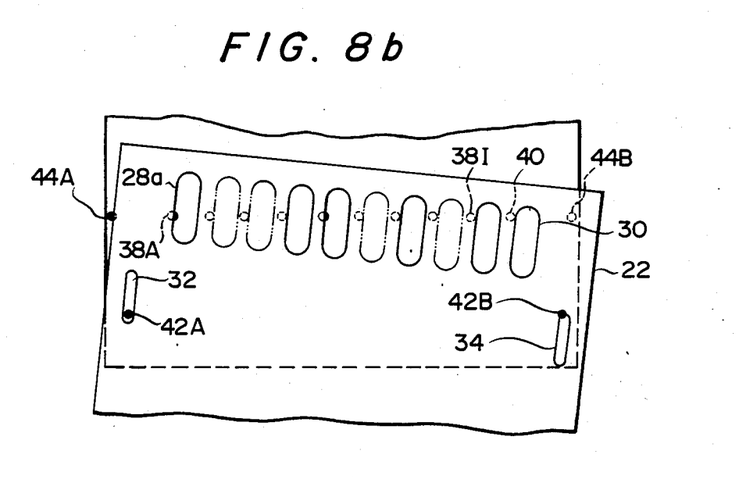

More specifically, the indication card 22 passing through the reader 24 with the inclination angle of 5 degrees (as shown in FIG. 8 (a) and (b)) causes the output signal of the sensor 44A to be turned on at the reading position where the output signals of the sensors 42A and 42B are turned on. Upon receiving these signals of the sensors 42A, 42B and 44A, the processing unit 26 inhibits the reading of the information code of the indication card 22. In addition, FIG. 8(a) shows the attitude of the indication card 22 at time point t2 and FIG. 8(b) at time point t3. Further, even when the indication card 22 is inversely inclined with respect to the attitude of FIGS. 8(a) and (b) and conveyed along the assembly line, the sensor 44B is turned on at the reading position where the sensors 42A and 42B are turned on, whereby reading of the information code of the indication card 1 is inhibited.

Figure 13A:
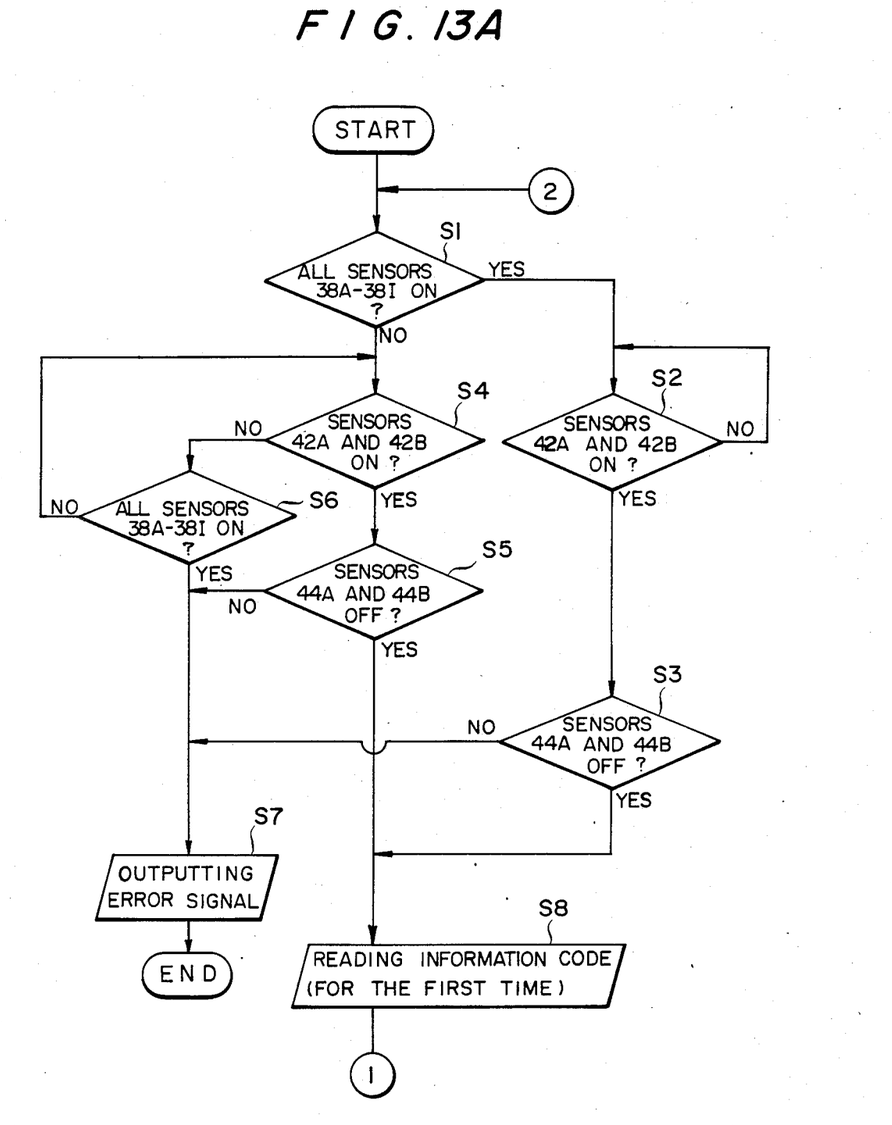
FIGS. 13A and 13B are flowcharts showing a procedure for reading an information code of the indication card according to the present invention.
Figure 13B:
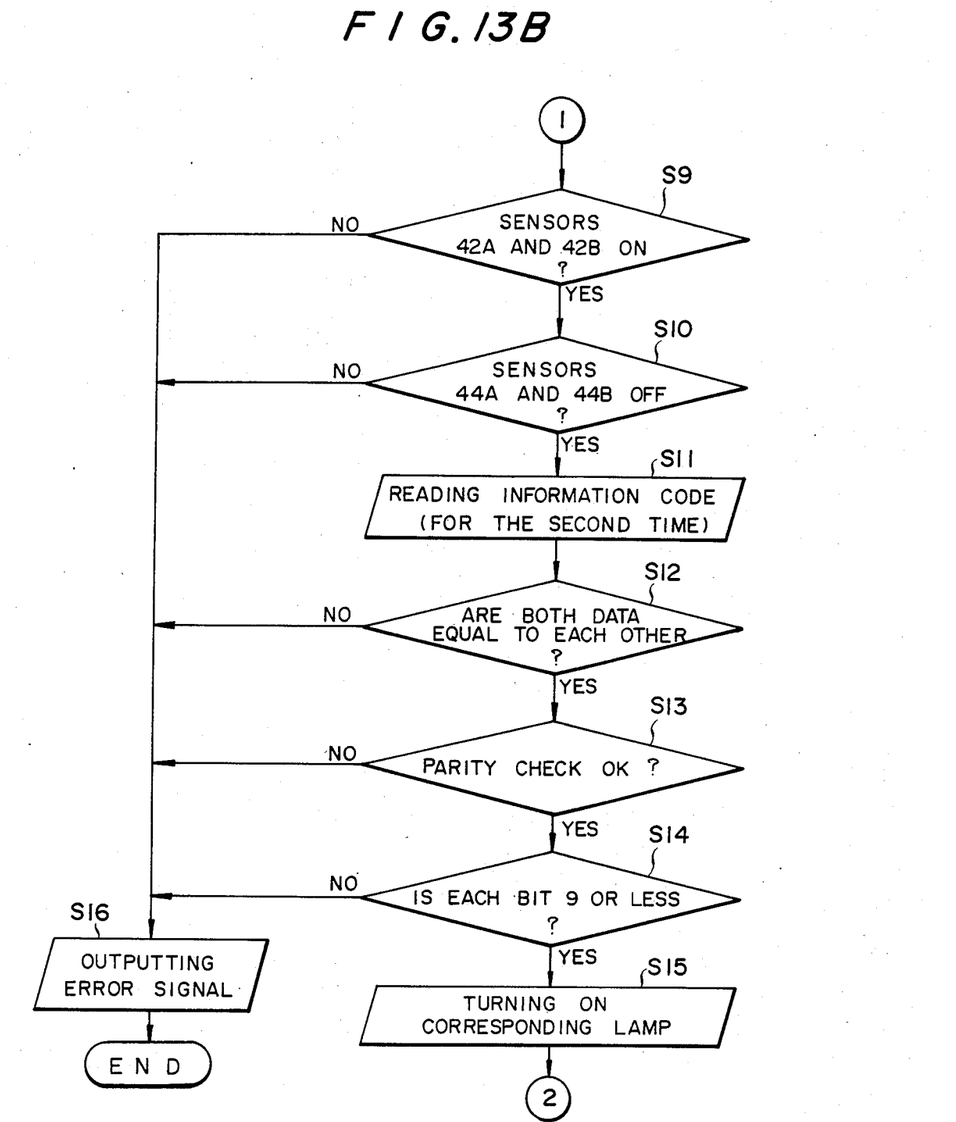

A procedure of reading the indication card 22 will be explained along with flowcharts shown in FIGS. 13A and 13B. The programming as shown in the flowcharts is preprogrammed in the ROM of the processing unit 26. The information code of the indication card 22 is read in response to the outputs of the reader 24 in accordance with the programming.

In a step S1, determination is made as to whether all sensors 38A–38I are on or not. If no indication card 22 has reached the reader 24 or all apertures 28a–28i are provided, an affirmative decision is obtained and the process proceeds to a step S2. In the step S2, determination is made as to whether the first detecting sensors 42A and 42B are on or not. If an affirmative decision is made in the step S2, the process goes to a step S3 where determination is made as to whether the second detecting sensors 44A and 44b are off or not. If a negative decison is made in the step S1, the process goes to a step S4 where the first detecting sensors 42A and 42B are on or not. If an affirmative decision is made, the process goes to a step S5 where the second detecting sensors 44A and 44B are off or not. If a negative decision is made in the step S4, the process goes to a step S6 where determination is made as to whether all sensors 38A–38I are on or not.

If the indication card 22 has partially reached the reading position, the negative decisions are made in the steps S1 and S4, respectively, and the process goes to the step S6. In case the all apertures 28a–28i are provided and affirmative decision is made in the step S6, an error signal is generated in a step S7. Even if the first detecting sensors 42A and 42B are on, the negative decision in the steps S3 or S5 is made unless the second detecting sensors 44A and 44B are off. The on-state of either sensor 44A or 44B means that the indication card 22 is conveyed with 5 or more degrees of inclination angle thereof. A warning sound may be issued or a warning lamp may be turned on in accordance with the error signal. Alternatively, the conveyor belt may be stopped for a predetermined period of time.

If the affirmative decision is made in the step S3 or S5, the process goes to a step S8 where the information code indicated by the on-off outputs of the sensors 38A–38I is temporarily stored in a storage area. Then, in a step S9, determination is made as to whether the first detecting sensors 42A and 42B are on or not and the process goes to a step S10 in response to an affirmative answer in the step S9. In the step S10, determination is made as to whether the second detection sensors 44A and 44B are off or not. If an affirmative decision is made in the step S10, the process goes to a step S11 where the information code indicated by the on-off outputs of the sensors 38A–38I is temporarily stored in the storage area. In a step S12, the information code read for the first time is compared with one for the second time. If two information codes are identical with each other, the process goes to a step S13 where a parity check is made on the information code thus read. If yes in the step S13, the process proceeds to a step S14 where determination is made as to whether each bit of the information code expressed in a form of a binary coded decimal indicates less than "9". If an affirmative decision is made in the step S14, the process goes to a step S15 where the lamp corresponding to the read information code is turned on so that a worker is informed of the parts to be assembled. If the negative answer is made in each of steps S9–S14, the error signal is generated in a step S16.

The step S14 is provided in order to monitor a defective indication card having a bit indicating more than 9 in the decimal system. The detective indication card is made in the course of a manufacturing process thereof or by a breakage thereof in its usage. The step S6 is provided because of a similar reason.

What is claimed is:

1. A control apparatus for assembling parts comprising:

an indication card having at least a pair of apertures for determination of reading position spaced from each other and a group of apertures representing an information code and provided on a line substantially parallel to a line connecting to the centers of said pair of apertures;

a plurality of information code reading sensors each including a pair of a light emitting element and a light receiving element, said information code reading sensors being arranged in such a manner that an interval between said information code reading sensors is identical with an interval between said apertures representing information code and said light receiving element receives a light from said light emitting element passing through said aperture representing the information code;

a pair of main reading position detecting sensors each including a pair of a light emitting element and a light receiving element, said main reading position detecting sensors being arranged in such a manner that an interval between said main reading position detecting sensors is identical with an interval between said pair of apertures for confirmation of the reading position and said light receiving element of said main reading position detecting sensors receives a light from said light emitting element passing through said pair of apertures for confirmation of the reading position;

a pair of auxiliary reading position detecting sensors each including a pair of a light emitting element and a light receiving element, said auxiliary reading position detecting sensors being arranged in such a manner that when said indication card is conveyed with a predetermined degree of inclination angle thereof or more, either one of said light receiving elements of said auxiliary reading position detecting sensors receives a light from said light emitting element of said auxiliary reading position detecting sensors even if said indication card is at said reading position; and a processor means connecting to said information code reading sensors and said main and auxiliary reading position detecting sensors, for determining that said indication card reaches said reading position when both said light receiving elements of said main reading position detecting sensors receive the lights from said light emitting elements thereof and no light is received by both said light receiving element of said auxiliary reading position sensors, so that said outputs of said light receiving elements of said information code reading sensors are processed in order that an indication signal indicating an indication information is issued, wherein no output of said light receiving element of said auxiliary reading position detecting sensors is taken by said processor means when at least either one of light receiving element of said auxiliary reading position detecting sensors receives the light from said light emitting element thereof.

2. A control apparatus for assembling parts according to claim 1, further comprising a plurality of lamps one of which being turned on in response to the corresponding indication signals, said each lamp being provided with respect to said parts to be assembled.

3. A control apparatus for assembling parts according to claim 1, wherein said processor means takes in said information code twice while said indication card is at the reading position so as to store into a storage area said information codes thus taken, and when said two information codes in said storage area are identical with each other, said indication signal is produced by said processing means.

4. A control apparatus for assembling parts according to claim 3, wherein when said information codes to be compared with each other are different from each other, no indication signal is produced by said processing means.

5. A control apparatus for assembling parts according to claim 1, wherein said information code is represented in a form of a binary coded decimal system.

6. A control apparatus for assembling parts according to claim 5, wherein when each place of the binary coded decimal is more than 9, no indication signal is produced by said processing means.

* * * * *